US012739550B2

(12) United States Patent
Crumitie

(10) Patent No.: US 12,739,550 B2
(45) Date of Patent: Sep. 15, 2026

(54) MOUTH AND LIP SHIELDING DEVICE

(71) Applicant: John Crumitie, Orlando, FL (US)

(72) Inventor: John Crumitie, Orlando, FL (US)

( * ) Notice: Subject to any disclaimer, the term of this patent is extended or adjusted under 35 U.S.C. 154(b) by 93 days.

(21) Appl. No.: 18/635,855

(22) Filed: Apr. 15, 2024

(65) Prior Publication Data

US 2024/0357270 A1 Oct. 24, 2024

Related U.S. Application Data

(60) Provisional application No. 63/461,048, filed on Apr. 21, 2023.

(51) Int. Cl.
*H04R 1/08* (2006.01)
*H04R 1/10* (2006.01)

(52) U.S. Cl.
CPC ........... *H04R 1/083* (2013.01); *H04R 1/1008* (2013.01); *H04R 2201/107* (2013.01)

(58) Field of Classification Search
CPC . H04R 1/083; H04R 1/1008; H04R 2201/107
See application file for complete search history.

(56) References Cited

U.S. PATENT DOCUMENTS

D792,377 S * 7/2017 Humphreys ................. D14/206
10,349,159 B2 * 7/2019 Pruitt ..................... H04R 1/086
10,542,339 B1 * 1/2020 Ruth ........................ H04R 1/08
10,959,004 B2 * 3/2021 Ketzner ............... H04R 1/1091
11,134,326 B2 * 9/2021 Johnson ................. H04R 1/083
11,305,137 B1 4/2022 McGhie et al.
11,831,797 B2 * 11/2023 Anvari ............. G10K 11/17881
2004/0213427 A1 * 10/2004 Yoon .................... H04R 1/1058 381/370
2008/0089546 A1 4/2008 Ward
2008/0134402 A1 6/2008 Bailey
2008/0304690 A1 12/2008 Poindexter
2010/0034412 A1 2/2010 Parda
2012/0095768 A1 * 4/2012 McClung, III .......... G10L 15/22 704/E11.001
2015/0373447 A1 * 12/2015 Ball ....................... H04R 1/086 381/359
2016/0293065 A1 * 10/2016 Cunningham, Sr. .... G09F 21/02
2017/0070798 A1 * 3/2017 Arnold .................. H04R 1/086

(Continued)

OTHER PUBLICATIONS

International Search Report and Written Opinion; PCT Application PCT/US2025/022818; dated Jun. 10, 2025 (11 pages).

*Primary Examiner* — Paul W Huber
(74) *Attorney, Agent, or Firm* — Jason T. Daniel, Esq.; Daniel Law Offices. P.A.

(57) ABSTRACT

A mouth and lip shielding device includes an elongated malleable member having a first end and a second end. A headphone attachment mechanism is positioned along the first end of the elongated member and secures the device onto the boom swivel housing of a headset. A privacy panel is secured along the second end of the elongated member at a location adjacent to the headset microphone. The privacy panel is hingedly secured to the elongated member and transitions between a closed position for covering the mouth of a user, and an open position that does not cover the mouth of a user. The attachment mechanism permits the device to pivot up and down with an up and down movement of the headset microphone.

14 Claims, 6 Drawing Sheets

(56) References Cited

U.S. PATENT DOCUMENTS

| | | | |
|---|---|---|---|
| 2021/0337887 | A1 | 11/2021 | Johnson |
| 2022/0295165 | A1 | 9/2022 | Perkins |
| 2024/0357270 | A1 | 10/2024 | Crumitie |

* cited by examiner

MOUTH AND LIP SHIELDING DEVICE

CROSS-REFERENCE TO RELATED APPLICATIONS

This application claims the benefit of U.S. Application Ser. No. 63/461,048 filed on Apr. 21, 2023, the contents of which are incorporated herein by reference.

TECHNICAL FIELD

The present invention relates generally to communication devices, and more particularly to a device for shielding the mouth and lips of a person from being viewed by others.

BACKGROUND

The statements in this section merely provide background information related to the present disclosure and may not constitute prior art.

Within competitive sports, the coaching staff is in constant communication with each other and their players throughout the game. In many sports, it is common for the coaching staff to utilize communication headsets 1 such as that shown in background FIG. 1 having a microphone 2 that is connected to the speaker cup 3 via an elongated boom 4 and boom swivel housing 5. A headband 6 extends from the speaker cup 3 and terminates into a secondary speaker cup 7 or stopper mechanism.

While many of the communications using the headsets are mundane, there are several times where game-critical information such as play calling, injury status or other such items are discussed. Because most sports do not permit teams to monitor radio communications of their opponents, it is not uncommon for members of the opposing team to attempt to read the lips of the coaches in order to obtain information and gain a competitive advantage.

Indeed, this is such a common practice that most professional, college, and even high school coaches routinely use a folder to cover their mouth when speaking into their headsets during a game. Although the process of manually covering their mouth is useful, the fact remains that coaches often forget to cover their mouths which allows opponents and even commentators to discern what is being said.

Accordingly, it would be beneficial to provide a mouth and lip shielding device that can be used in conjunction with new or existing headset devices to protect the communications of a user from lip readers, thus alleviating the drawbacks noted above.

SUMMARY OF THE INVENTION

The present invention is directed to a mouth and lip shielding device. One embodiment of the present invention can include an elongated malleable member having a first end and a second end. A headphone attachment mechanism can be secured along the first end of the elongated member and can function to secure the device onto the boom swivel housing of the headset, and a privacy panel can be secured along the second end of the elongated member at a location adjacent to the microphone of the headset.

In one embodiment, the privacy panel can be hingedly secured to the elongated member and can transition between a closed position for covering the mouth of a user, and an open position that does not cover the mouth of a user.

Additionally, the device can pivot up and down with a movement of the headset microphone to permit ordinary use of the headset.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
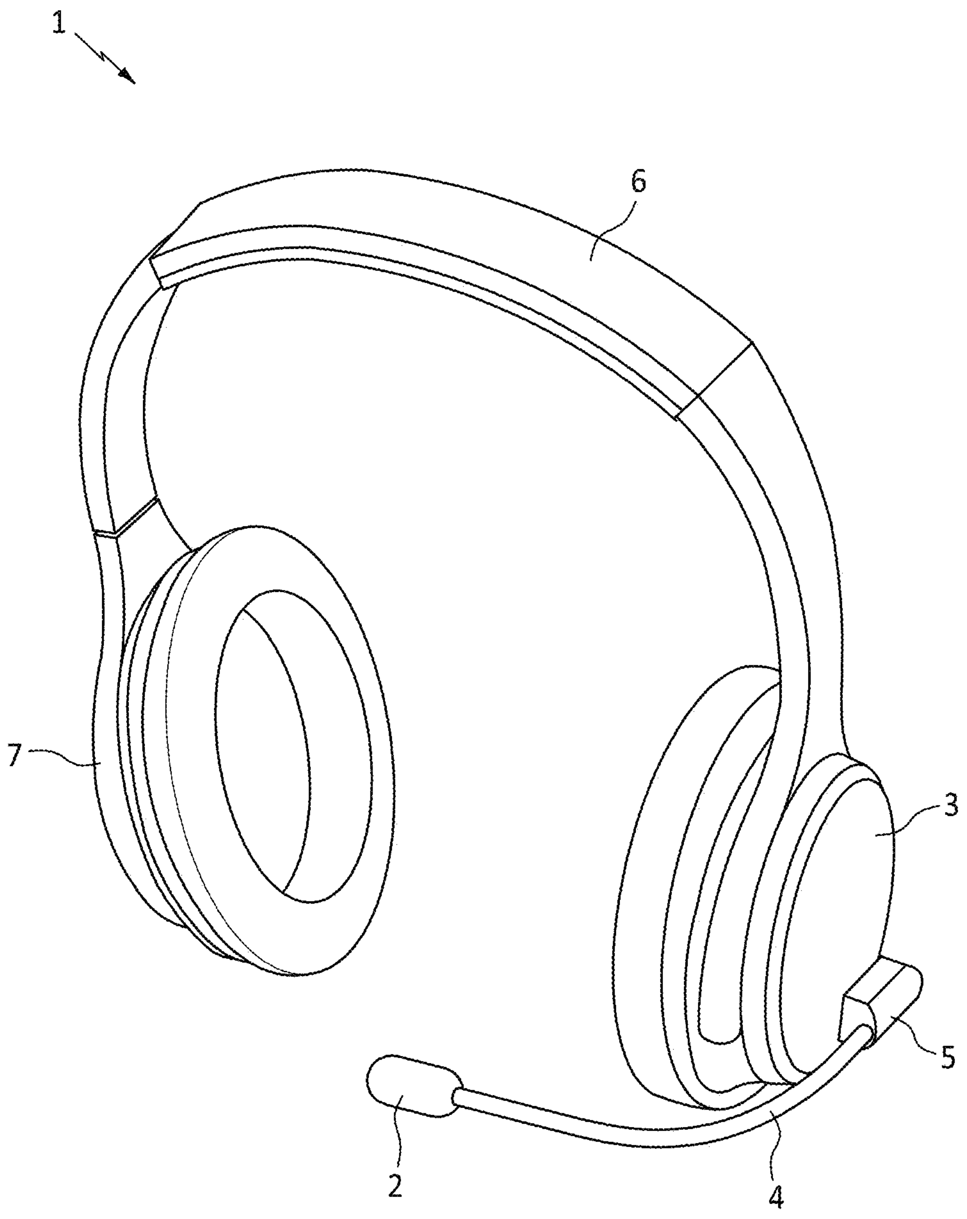
FIG. 1 (BACKGROUND ART)
FIG. 1 is a perspective view of a communications headset in accordance with background art.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a “unit” and a “mechanism” means a series of identified physical components which are linked together and/or function together to perform a specified function.

As described throughout this document, the term “about” “approximately” “substantially” and “generally” shall be used interchangeably to describe a feature, shape, or measurement of a component within a tolerance such as, for example, manufacturing tolerances, measurement tolerances or the like.

As described herein, the term “removably secured,” and derivatives thereof shall be used to describe a situation wherein two or more objects are joined together in a non-permanent manner so as to allow the same objects to be repeatedly joined and separated.

As described throughout this document, the term “complementary shape,” and “complementary dimension,” shall be used to describe a shape and size of a component that is identical to, or substantially identical to the shape and size of another identified component within a tolerance such as, for example, manufacturing tolerances, measurement tolerances or the like.

As described herein, the term “connector” includes any number of different elements that work alone or together to repeatedly join two items together in a nonpermanent manner. Several nonlimiting examples of connectors include, but are not limited to, thread-to-connect, twist-to-connect, and push-to-connect type devices, opposing strips of hook and loop material (e.g., Velcro®), attractively oriented magnetic elements or magnetic and metallic elements, buckles, clamps, sockets, clips, carabiners, general compression fittings and snaps, for example. Each illustrated connector and complementary connector can be permanently secured to the illustrated portion of the device via a permanent sealer such as glue, adhesive tape, or stitching, for example.

As described herein, the term “shape memory” is defined as the ability of a component to maintain a particular shape and to attempt to return to the particular shape after being bent, folded, twisted or otherwise manipulated.

As described herein, the term “cover” is used to describe the ability of the privacy panel to obstruct the ability of an individual to view the mouth of a user wearing a headset to which the inventive device is attached.

Although described with regard to communications from a coaching staff or in a sporting environment, this is but one possible use of the inventive device, as there are many other individuals that would benefit from ensuring their conversations remain hidden from lip readers. Several nonlimiting examples include, but are not limited to, referees speaking to each other and/or players on the bench conversing with each other, among others, for example.

Figure 2:
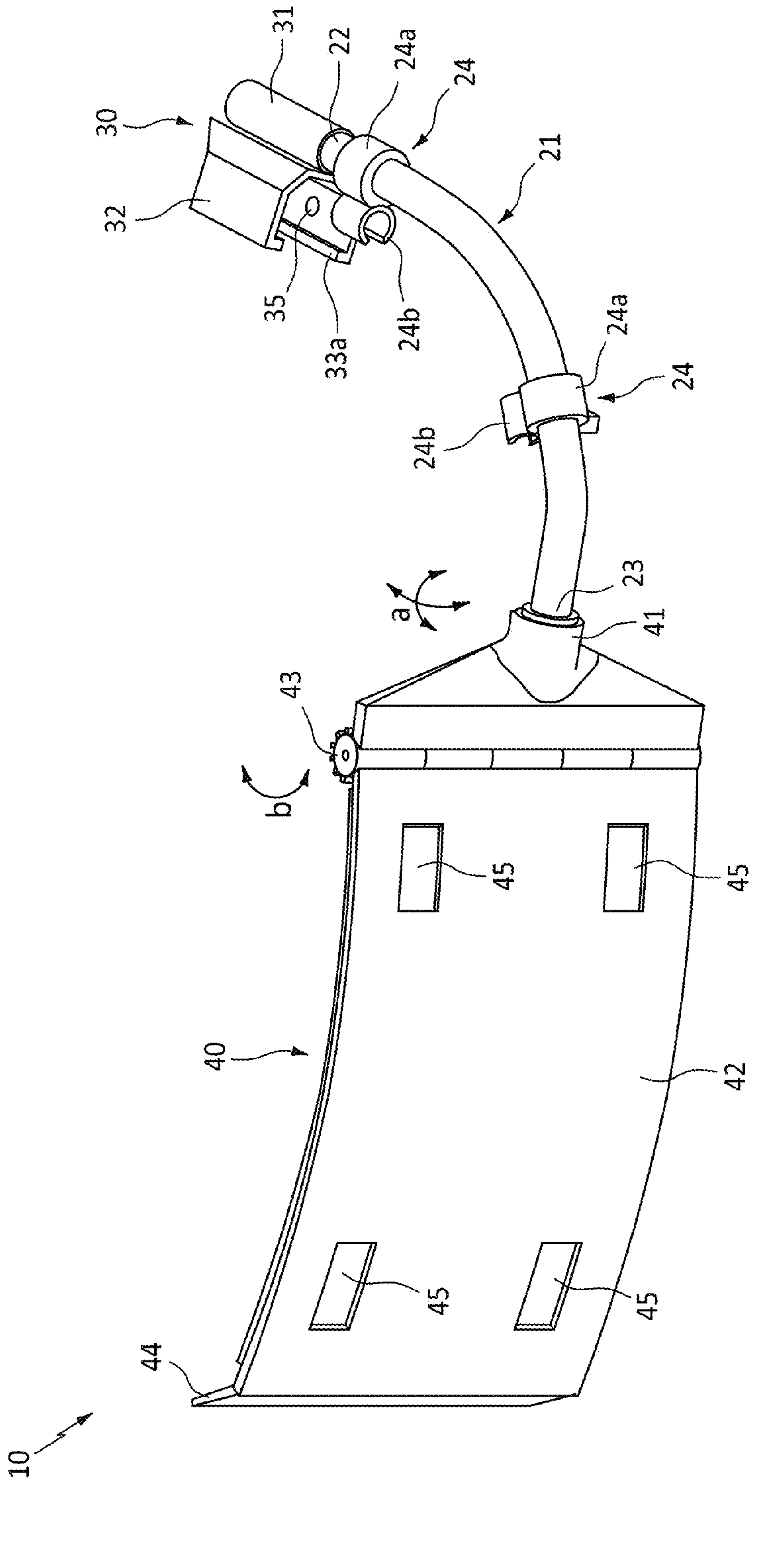
FIG. 2 is a front perspective view of the mouth and lip shielding device in accordance with one embodiment of the invention.
Figure 3:
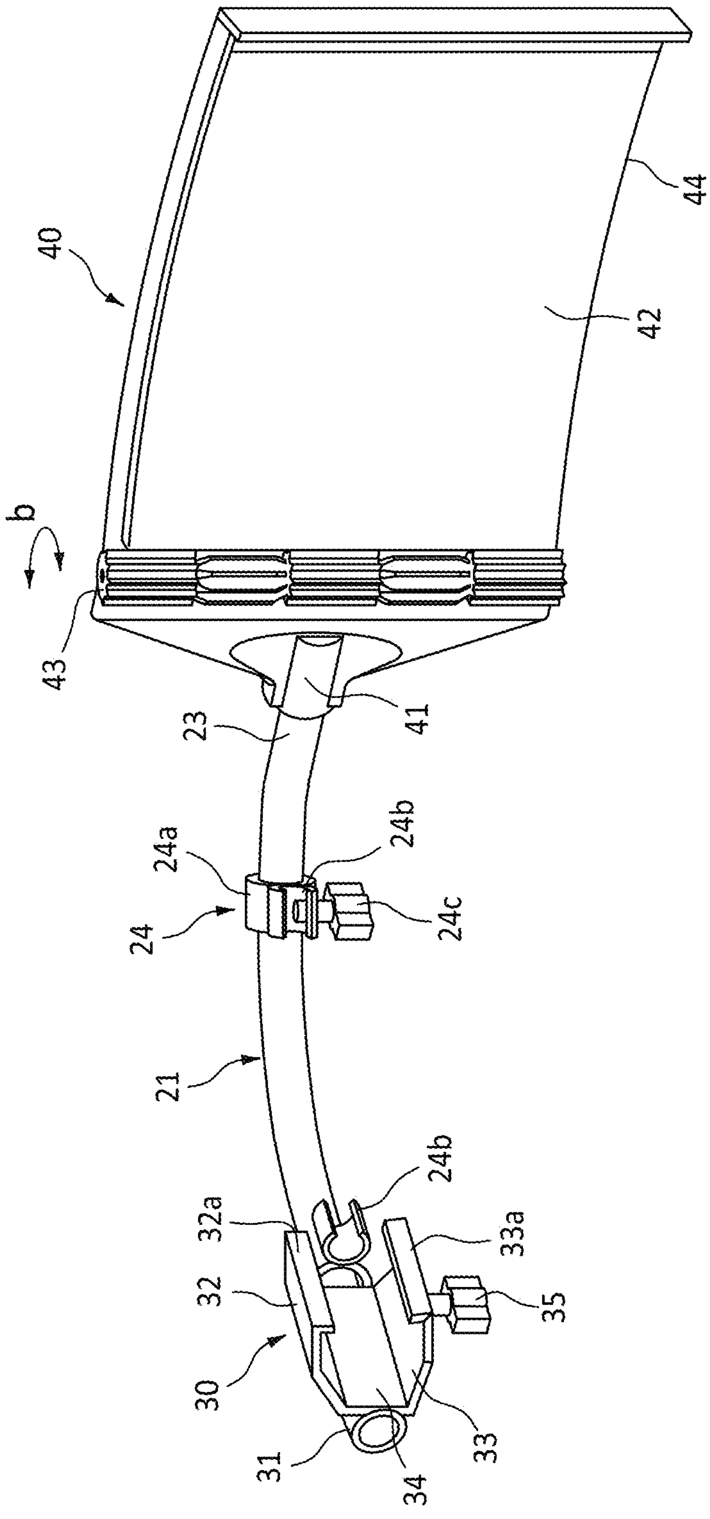
FIG. 3 is a back perspective view of the mouth and lip shielding device in accordance with one embodiment of the invention.
Figure 4:
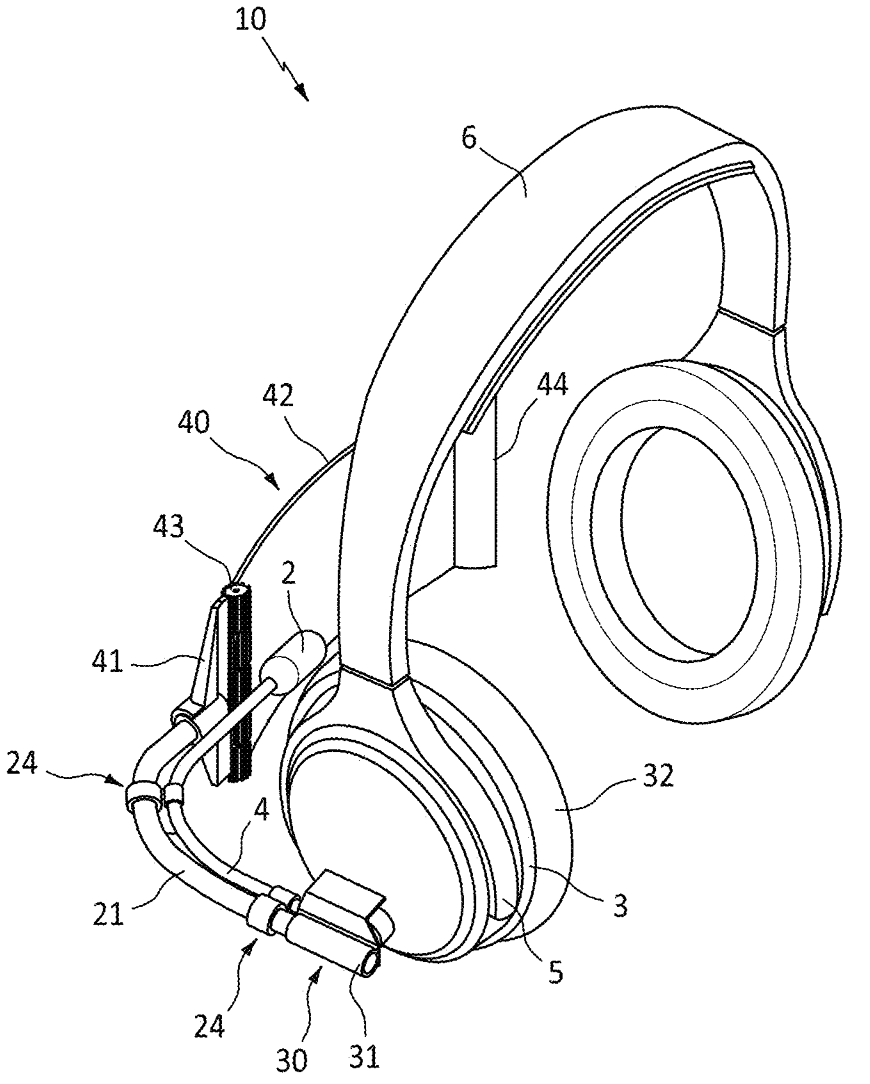
FIG. 4 is a back perspective view of the mouth and lip shielding device secured onto a communications headset, in accordance with one embodiment of the invention.
Figure 5:
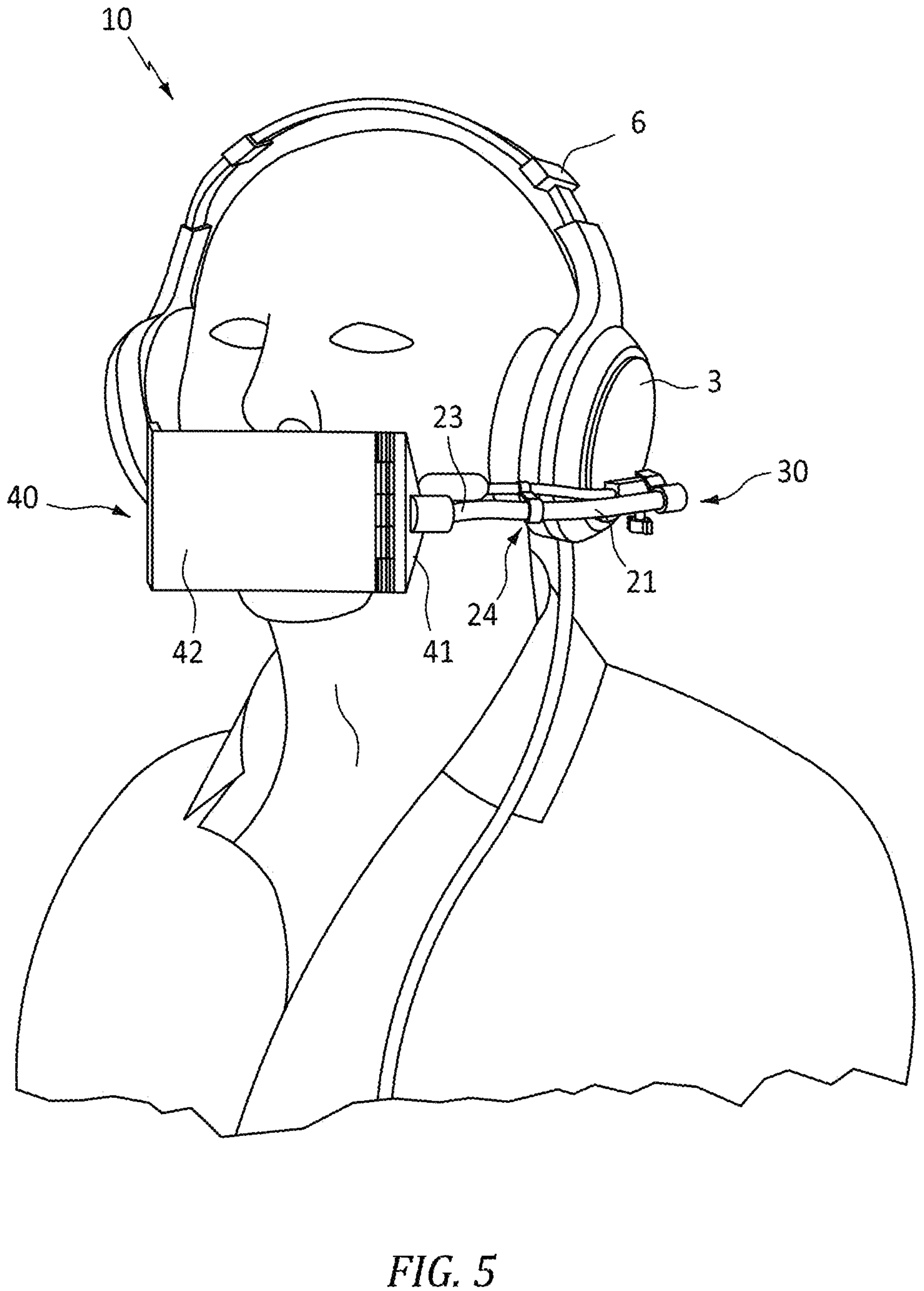
FIG. 5 is a front view of the mouth and lip shielding device in the down and closed position, in accordance with one embodiment of the invention.
Figure 6:
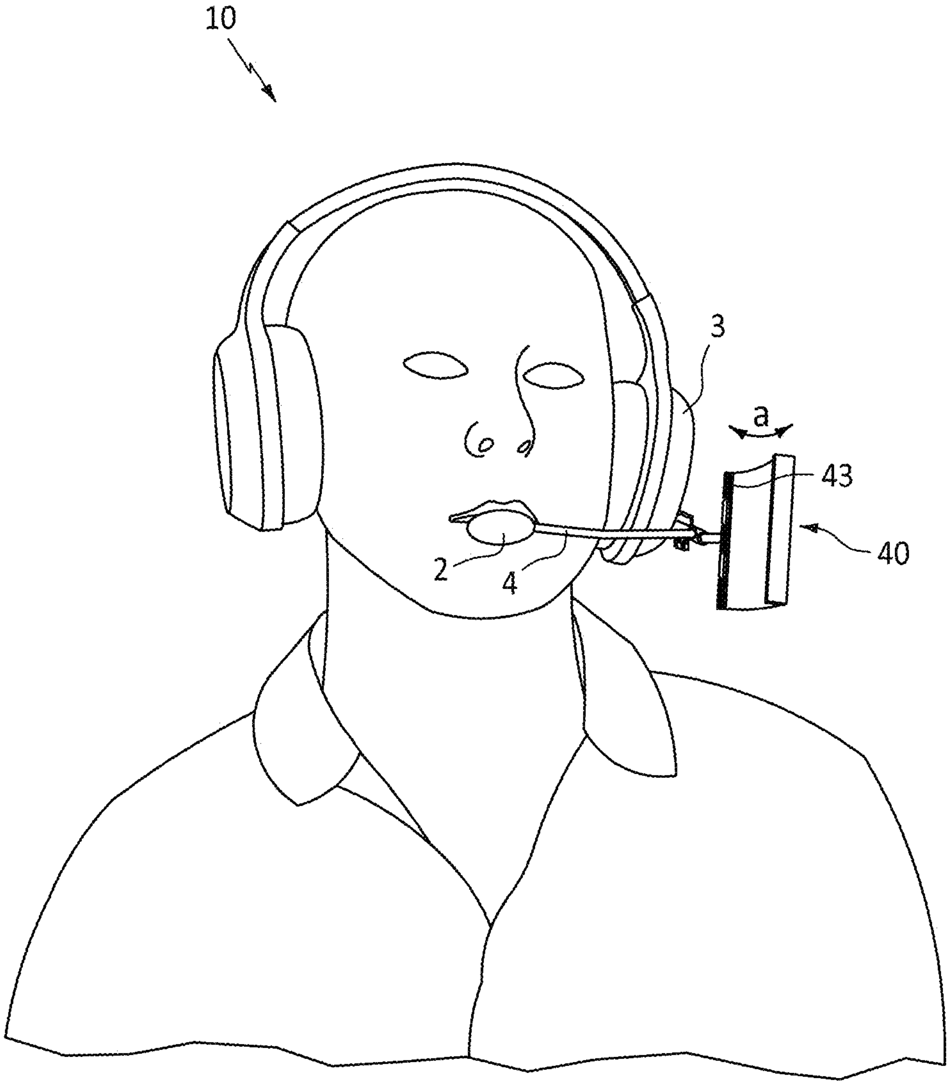
FIG. 6 is a front view of the mouth and lip shielding device in the down and open position, in accordance with one embodiment of the invention.

FIGS. 2-7 illustrate one embodiment of a mouth and lip shielding device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms “upper,” “bottom,” “right,” “left,” “front,” “vertical,” “horizontal,” and derivatives thereof shall relate to the invention as oriented in FIG. 2.

As shown in the drawings, the device 10 can include, essentially, an elongated malleable extension arm having a headset attachment mechanism along a first end, and an adjustable privacy panel along a second end.

In one embodiment, the extension arm 21 can include an elongated generally tubular-shaped member having a first end 22, and a second end 23. As shown by arrow a, the extension arm can preferably be malleable in nature so as to allow a user to bend the arm in order to change the position of the privacy panel 40 relative to the headset clip 30 to any number of different positions. Such a feature is important for allowing the extension arm to form a shape that is complementary to the shape of the microphone boom 4 which is typically malleable in nature, and to bend and adjust in conformity with movements of the boom.

In one embodiment, the extension arm can remain in the adjusted position; whereas other embodiments are contemplated wherein the arm includes shape memory so as to automatically return to the original shape after being bent, folded or otherwise manipulated. In this regard, the arm can be constructed from any number of different materials such as various plastics, metals, composite materials, or combinations of the same suitable for achieving the above-described functionality.

In one embodiment, a pair of microphone boom clips 24 can be positioned along the length of the extension arm. As shown, each of the clips can include a hollow cylindrical-shaped base **24*a* that is fixedly or slidingly coupled to the extension arm 21, and a generally C-shaped clip section 24*b* that is configured to engage the microphone boom 4 of a headset 1 (See FIG. 4). In one embodiment, an optional tightening mechanism such as the illustrated thumb screw 24*c*** can be provided along one or both of the clips in order to securely engage microphone booms having any number of different shapes and sizes.

Although described and illustrated with regard to a tubular shaped extension arm, a cylindrical-shaped base and two clips, other embodiments are contemplated. To this end, the extension arm and base may be any number of different cooperating shapes, and the device can include more or fewer clips. Moreover, the clip section(s) may be replaced with any number of other types of connectors suitable for removably engaging the microphone boom of a headset.

The headset attachment mechanism 30 is designed to secure the device 10 onto a headset 1 and can include a base section 31 having an opening into which the first end 22 of the extension arm 21 is positioned. In one embodiment, the attachment mechanism is designed to engage the boom swivel housing 5 of a commercially available headset having known dimensions. As such, the mechanism can include an elongated generally C-shaped clip having a shape and size that is complementary to the shape and the size of the boom swivel housing to which the device is to be secured.

For example, the clip of the mechanism 30 can include a top wall 32 having a lip **32*a* along a distal end, and a bottom wall 33 having a lip 33*a* along a distal end. Each of the top and bottom walls extend outward from a front wall 34 that is connected to the base section 31. In one embodiment, another tightening mechanism such as the illustrated thumb screw 35** can be provided along the top or bottom wall.

When connected to the headset, the outer surface of the boom swivel housing 5 is positioned against the front wall 34, and the lips **33*a* and 34*a* engage the upper and lower ends of the inside surface of the boom swivel housing 5 located adjacent to the speaker cup 3**. The clip is held in place via the compression force of the mechanism and the thumb screw extending into the space between the walls so as to engage the housing directly.

By connecting directly to the swivel housing 5, the device 10 does not interfere with the ordinary use and functionality of the headset and allows the microphone 2 and boom 4 to swivel up and down (e.g., transition between up position and down position) in normal operation as shown by arrow c in FIG. 7. When so positioned, the device 10 will move up and down with the movement of the headset microphone.

Although described above with regard to a particular shape or size, this is for illustrative purposes only, as the base section 31 can include any cooperating shape and connection mechanism suitable for engaging the end of the extension arm 21. Likewise, the clip of the attachment mechanism 30 may be replaced or augmented with any number of other types of connectors suitable for removably engaging the headset 1 at any location such as the swivel housing 5, the speaker cup 3, the boom arm 4 and/or the head band 6 of a headset, for example.

The privacy panel 40 can function to shield the mouth area of a user when connected to a headset and will preferably be constructed from a solid piece of lightweight material such as plastic, for example. In one embodiment, the panel 40 can include a panel base section 41 having an opening into which the second end 23 of the extension arm 21 is positioned.

In one embodiment, an elongated generally rectangular-shaped body section 42 is secured onto the base section via a hinge 43 to permit the panel to rotate (arrow b) 180 degrees relative to the end of the extension arm. Such a feature advantageously allows a user to adjust the position of the shield body relative to the microphone 2 to accommodate differences in microphone sizes and/or sound filters which often cover the microphone itself. Additionally, this feature allows the user to position the shield away from their mouth when they do not want their mouth covered (see FIG. 6).

In one embodiment, the distal end of the panel may include a lip section 44 that extends inward, so as to prevent others from seeing the mouth of a user from the side. Likewise, any number of indicia connecting components 45 such as various snaps, hook and loop material or other such connectors may be provided along the outside surface of the panel body. Each of the connectors can function to receive and position items such as team logos, advertisements, pictures or other such items that are intended to be seen by others.

Although not specifically illustrated, other embodiments are contemplated wherein the back surface of the privacy panel includes padding or sound dampening material such as foam, for example and/or wherein a length or height of the panel is adjustable (e.g., the panel includes a fixed panel section and a sliding panel section that extends into and out of an opening on one side of the panel) for allowing the size of the panel itself to be adjustable. Other contemplated embodiments include positioning an attachment mechanism directly onto the back surface of the privacy panel for allowing the same to connect directly onto the microphone or microphone boom without utilizing the extension arm which may be omitted or provided as being removable from the privacy panel.

Although described above with regard to a particular shape or size, this is for illustrative purposes only, as the base section 41 can include any cooperating shape and connection mechanism suitable for engaging the end of the extension arm 21. Likewise, the panel body can include any number of different shapes and sizes suitable for covering the mouth of a user.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A device, comprising:

an elongated member having a first end and a second end;

an attachment mechanism that is secured along the first end of the elongated member; and a privacy panel that is secured along the second end of the elongated member, wherein the attachment mechanism includes functionality for engaging a headset, and wherein the privacy panel is configured to be positioned adjacent to a microphone of the headset, wherein the attachment mechanism is configured to engage a swivel housing of the headset, and wherein the first end of the elongated member extends linearly away from the attachment mechanism, and the elongated member is configured to be oriented parallel to a microphone boom extending out from the swivel housing.

2. The device of claim 1, wherein the elongated member is constructed from a malleable material and is configured to adjust to a shape of a microphone boom connecting the microphone to a speaker cup of the headset.

3. The device of claim 2, further comprising:

at least one boom clip that is positioned along the elongated member.

4. The device of claim 3, wherein each of the at least one boom clip is configured to removably engage the microphone boom.

5. The device of claim 3, wherein each of the at least one boom clip is fixedly secured onto the elongated member.

6. The device of claim 3, wherein each of the at least one boom clip is slidingly secured onto the elongated member.

7. The device of claim 1, wherein the attachment mechanism includes functionality for permitting the device to transition between a device up position and a device down position in conformity with a movement of the microphone to a microphone up position and a microphone down position.

8. The device of claim 7, wherein in the device down position and the microphone down position, the privacy panel covers a mouth of a user wearing the headset.

9. The device of claim 7, wherein in the device up position and the microphone up position, the privacy panel does not cover a mouth of a user wearing the headset.

10. The device of claim 1, wherein the elongated member includes shape memory.

11. The device of claim 1, wherein the attachment mechanism includes a clip having a shape and a size that is complementary to a shape and a size of a swivel housing of the headset, and said clip being configured to secure the attachment mechanism to the swivel housing.

12. The device of claim 1, wherein the privacy panel is configured to be positioned adjacent to a microphone positioned along a distal end of the microphone boom.

13. The device of claim 12, wherein each of the elongated member and the privacy panel are configured to move in conformity with a movement of the microphone boom and microphone.

14. The device of claim 1, further comprising:

a hinge that is positioned between the second end of the elongated member and the privacy panel, said hinge functioning to permit the privacy panel to rotate 180 degrees relative to the elongated member.

* * * * *